United States Patent [19]

Nakai et al.

[11] Patent Number: 4,786,677

[45] Date of Patent: Nov. 22, 1988

[54] RUBBER COMPOSITION CONTAINING A CARBON BLACK PARTICLES HAVING TWO MODAL DIAMETERS IN THE AGGREGATE

[75] Inventors: Kiyonari Nakai; Masahiko Mito, both of Aichi, Japan

[73] Assignee: The Tokai Carbon Co., Ltd., Tokyo, Japan

[21] Appl. No.: 127,317

[22] Filed: Dec. 2, 1987

[30] Foreign Application Priority Data

Jan. 21, 1987 [JP] Japan ............................ 62-9956

[51] Int. Cl.$^4$ ............................................. C08K 3/04
[52] U.S. Cl. .................................. 524/496; 524/526; 524/571
[58] Field of Search .................. 524/496, 495

[56] References Cited

U.S. PATENT DOCUMENTS

| | | | |
|---|---|---|---|
| 4,548,980 | 10/1985 | Nagata | 524/496 |
| 4,550,135 | 10/1985 | Iwama et al. | 524/496 |
| 4,721,740 | 1/1988 | Takeshita et al. | 524/496 |
| 4,732,927 | 3/1988 | Ida et al. | 524/496 |

FOREIGN PATENT DOCUMENTS

| | | | |
|---|---|---|---|
| 49267 | 3/1984 | Japan . | |
| 1091234 | 5/1986 | Japan | 524/496 |
| 1143453 | 7/1986 | Japan | 524/496 |
| 1207452 | 9/1986 | Japan | 524/496 |
| 2057434 | 3/1987 | Japan | 524/496 |

*Primary Examiner*—Herbert J. Lilling
*Attorney, Agent, or Firm*—Armstrong, Nikaido, Marmelstein & Kubovcik

[57] ABSTRACT

A rubber composition comprising 35 to 100 parts by weight of a carbon black per 100 parts by weight of a rubber component, the carbon black having a nitrogen adsorption specific surface area (N$_2$SA) within a range of 70 to 185 m$^2$/g and an aggregate characteristic which shows a first and a second modal diameters in the aggregate equivalent Stokes diameter distribution and has a difference between the two modal diameters L (nm) to be calculated from the following equation (1) which satisfies the following formula (2):

$$L = \bar{D}st_2 - \bar{D}st_1 \quad (1)$$

$$20 \leq L \leq 110 - 0.3 \, (N_2SA) \quad (2)$$

wherein $\bar{D}st_1$ and $\bar{D}st_2$ respectively denote the first modal diameter (nm) and the second modal diameter (nm) in the aggregate equivalent Stokes diameter distribution deteternined by a centrifugal classification method.

4 Claims, 1 Drawing Sheet aggregate equivalent Stokes diameter (nm)

RUBBER COMPOSITION CONTAINING A CARBON BLACK PARTICLES HAVING TWO MODAL DIAMETERS IN THE AGGREGATE

BACKGROUND OF THE INVENTION

The present invention broadly relates to a rubber composition. More specifically, the invention relates to such a rubber composition which has performance characteristics suitable for use of the rubber composition for tire treads.

Rubber-reinforcing carbon blacks are classified into a wide variety of kinds, depending on properties which they have, and the particular characteristics of respective kinds of carbon black constitute an important factor determinative of the performance characteristics of rubber compositions in which the carbon blacks are blended.

Thus, in blending a carbon black in a rubber component, it is widely practiced to make a selective use of a carbon black of suitable characteristics for the intended utility of the rubber composition.

For example, for the use of a rubber composition as a rubber member, such as a tire tread for example, which is required to possess a high abrasion resistance under severe service conditions, it is generally accepted to be effective to use such a carbon black which has a relatively small particle diameter and a relatively large specific surface area like, for example, SAF (super abrasion furnace), ISAF (intermediate super abrasion furnace) and HAF (high abrasion furnace) carbon blacks.

However, in the preparation of a rubber composition, to use a carbon black belonging to hard type ones such as the above ones tends to accompany not only an adverse affect on the ease of dispersion and the processability in the blending preparation of the rubber composition but also a disadvantageous increase of the heat generating propensity of the resulting rubber composition.

A lowering of the ease of dispersion and the processability means such a phenomenon in which, during the process of kneading a carbon black with a rubber component, the hardness of the blending components under kneading becomes so considerably increased that it becomes disturbed to smoothly operate a homogeneous dispersion. This phenomenon forms a factor of not only an increase in the required energy and time for the kneading operation but also a degradation of the quality and the performance characteristics of the product rubber composition.

Then, an increase in the heat generating propensity of the rubber composition is causative of a heat build-up which takes place in a tire due to a hysteresis loss during running of the tire and which gives rise to a danger such as a destruction of the tire interior structure or an aging of the tire forming material.

SUMMARY OF THE INVENTION

Above indicated inconveniences and difficulties in the prior art can be obviated if, with use of a carbon black having a relatively small particle diameter (or a relatively large specific surface area), it can be attained to improve the ease of dispersion of the carbon black in a rubber component and the processability in the preparation of a rubber composition and eventually provide a rubber composition imparted with a high abrasion resistance and a low heat generating propensity, at the same time. It then is feasible to provide a rubber composition having ideal rubber characteristics for a tire tread rubber.

Thus, with an attention paid particularly to characteristics of carbon blacks, the inventors of the present invention have variously attempted to improve the above referred-to contradictory performance characteristics of rubber compositions, namely the abrasion resistance and the ease of dispersion and the processability, and as a result of this, have ascertained that a rubber composition blended therein with such a carbon black as having a relatively broad aggregate size distribution while it has a fine particle diameter is suitable for use for the tread of large-size tires.

Also, as a result of a further series of studies made also by the present inventors, it has been ascertained that a rubber composition suitable for a tire tread rubber can be provided by blending in a rubber component such a carbon black as having two modal diameters within a particular range in the aggregate equivalent Stokes diameter distribution.

As can be seen from the above, it is the primary object of the present invention to provide a rubber composition having effectively improved performance characteristics with respect to the result of reinforcement by a carbon black, represented by a high abrasion resistance, and the dynamic characteristics such as a low heat generating propensity and a high resilience.

The above object of the present invention can be attained according to the present invention by providing a rubber composition which comprises 35 to 100 parts by weight of a carbon black per 100 parts by weight of a rubber component, the carbon black having a nitrogen adsorption specific surface area ($N_2SA$) within a range of 70 to 185 $m^2/g$ and an aggregate characteristic which shows two modal diameters in the aggregate equivalent Stokes diameter distribution and has a difference between the two modal diameters L to be calculated from the following equation (1) which satisfies the following formula (2):

$$L = \bar{D}st_2 - \bar{D}st_1 \qquad (1)$$

$$20 \leq L \leq 110 - 0.3(N_2SA) \qquad (2)$$

wherein $\bar{D}st_1$ and $\bar{D}st_2$ respectively denote a first modal diameter (nm) and a second modal diameter (nm) in the aggregate equivalent Stokes diameter distribution determined by a centrifugal classification method.

PREFERRED EMBODIMENTS OF THE INVENTION

Carbon blacks used for purposes of the present invention belong to hard region carbon blacks having a nitrogen adsorption specific surface area ($N_2SA$) within a range of 70 to 185 $m^2/g$. Carbon blacks having a $N_2SA$ within this range belong to a same region of hardness to which carbon blacks of from normal HAF carbon blacks to SAF carbon blacks belong, and to use such a carbon black forms a requirement for effectively imparting a high abrasion resistance to rubber compositions. With use of a carbon black having a $N_2SA$ value not reaching 70 m²/g, it is impossible to impart such a high abrasion resistance to a rubber composition as being enough to render the rubber composition useful for a tire tread rubber, while if the $N_2SA$ value of the carbon black exceeds 185 m²/g, the ease of dispersion and the processability in the preparation of the rubber composition are adversely affected.

Also, to be useful for the present invention, the carbon black should have, in addition to a nitrogen adsorption specific surface area within the above range, a particular aggregate characteristic.

Figure 1:
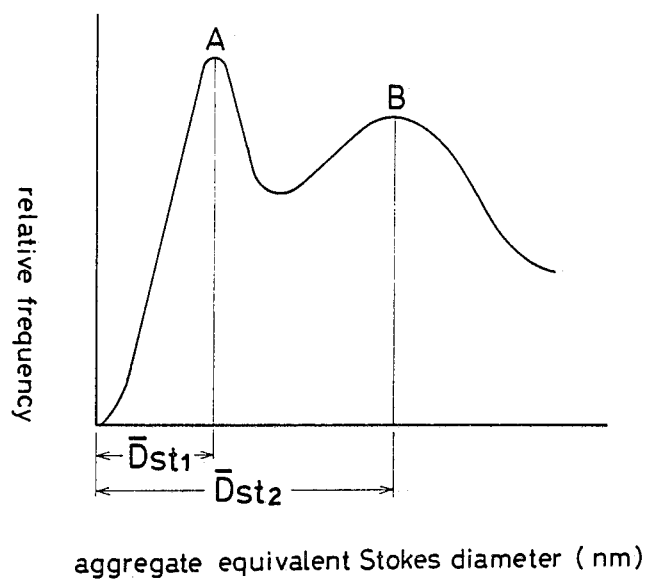
FIG. 1 is a view, showing an example of the aggregate equivalent Stokes diameter distribution of carbon blacks used in or for the present invention.

As shown in FIG. 1, useful carbon blacks for purposes of the present invention have an aggregate equivalent Stokes diameter distribution showing a first modal diameter A and a second modal diameter B and a difference between the two modal diameters L (nm) to be found according to the following equation (1), which difference satisfies the following formula (2):

$$L = \overline{D}st_2 - \overline{D}st_1 \quad (1)$$

$$20 \leq L \leq 110 - 0.3(N_2SA) \quad (2)$$

wherein $\overline{D}st_1$ and $\overline{D}st_2$ respectively denote a first modal diameter (nm) and a second modal diameter (nm) in the aggregate equivalent stokes diameter distribution determined by a centrifugal classification method.

When the above difference between the two modal diameters L (nm) is within the range represented by the above formula (2), it is feasible to obtain a rubber composition having required characteristics for the rubber composition for tire treads. Then, if the value for the L is in a range of $L > 110 - 0.3 (N_2SA)$, the result of reinforcement of rubber is considerably lowered, while if it is in a range of $L < 20$ not only the dispersion of the carbon black in rubber is obstructed and the processability is lowered but also it becomes difficult to sufficiently enhance the dynamic characteristics of the rubber composition.

The above defined characteristics of carbon blacks for use in the present invention, namely the nitrogen adsorption specific surface area ($N_2SA$) and the aggregate equivalent Stokes diameter distribution, were determined in the following manners.

(1) Nitrogen adsorption specific surface area ($N_2SA$) was determined by ASTM D3037-78 "Standard Methods of Testing Carbon Black - Surface Area by Nitrogen Adsorption", Method B. The nitrogen adsorption specific surface area ($N_2SA$) of IRB #5 found by this method is 80.3 m²/g.

(2) Determination of modal diameters ($\overline{D}st_1$ and $\overline{D}st_2$) in the aggregate equivalent Stokes diameter distribution to be determined by a centrifugal classification method was made as follows: A sample of each carbon black dried according to the method prescribed in JIS K6221-1982 5 was prepared by sampling by precision weighing, and the carbon black samples were mixed in a 20% aqueous ethanol solution containing an appreciable amount of a surface active agent (a dispersion medium) to prepare dispersion solutions having a carbon-black concentration of 50 mg/l, which were subjected to a sufficient dispersion by ultrasonic wave irradiation to prepare testing samples. A disc centrifuge device (a product of Joys Loebl, the United Kingdom) was set to rotate at a rotation velocity of 8000 rpm. A spin liquid (2% solution of glycerol in water), 10 ml, was added to the testing sample of carbon-black dispersion solution, and to the resulting mixture solution, 1 ml of a buffer liquid (an aqueous ethanol solution) was added by pouring. Then, 0.5 ml of the resulting testing sample was supplied into the disc centrifuge device, using a syringe. At the same time as the centrifugal classification was then initiated, an optical recorder was put into operation to obtain a curve of the aggregate equivalent Stokes diameter distribution. The modal diameter (nm) at the first modal point shown at A in FIG. 1 and the modal diameter (nm) at the second modal point shown at B in FIG. 1, in the above obtained distribution curve, were taken as $\overline{D}st_1$ and $\overline{D}st_2$, respectively.

Figure 2:
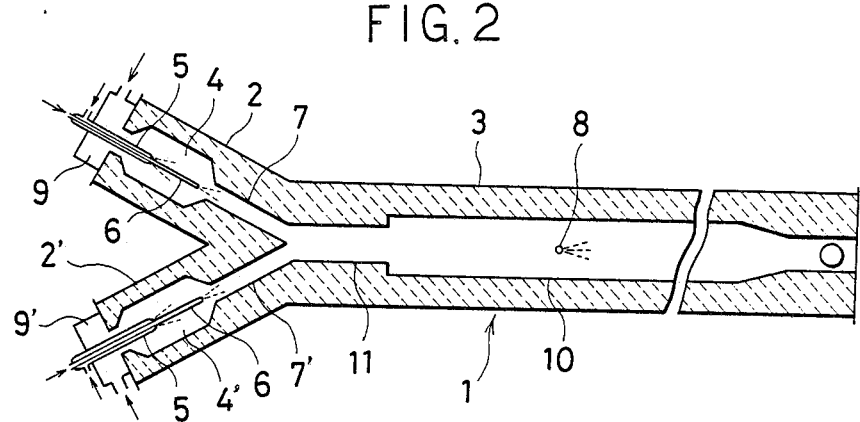
FIG. 2 is a schematic sectional view, showing an example of apparatus for producing carbon blacks used in or for the present invention.

The carbon black having the above specified characteristics for use for or in the present invention is prepared, for example according to Japanese patent application Kokai publication No. 59-49267, with use of an oil furnace of a V-shaped structure as shown in FIG. 2. As shown, the oil furnace generally indicated at 1 comprises two generators 2 and 2', and a main reaction zone 3 into which the generators 2 and 2' converge. The generator 2 comprises a combustion chamber 4 and a pyrolysis duct 7 connected to the combustion chamber 4, and the generator 2' comprises a combustion chamber 4' and a pyrolysis duct 7' connected to the combustion chamber 4'. In each of the combustion chambers 4 and 4', there are provided a burner 5 and a feedstock oil injection nozzle 6 which are coaxially arranged relative to each other. A gas stream of intermediate carbon black product formed in the combustion chamber 4 and a same gas stream formed in the combustion chamber 4' are at the same time introduced at a high speed into the main reaction zone 3 through the pyrolysis ducts 7 and 7' and subjected to collision against each other to obtain the intended carbon black product. Further, the reference numeral 8 denotes a spray nozzle for quenching water.

In the above preparation of carbon black, an adjustment or a control of the aggregate structure having two modal diameters in the aggregate equivalent Stokes diameter distribution and that of the difference L between the two modal diameters $\overline{D}st_1$ and $\overline{D}st_2$ can be effected by controlling the operation conditions of or in the two generators. Also, an adjustment of the nitrogen adsorption specific surface area ($N_2SA$) can be made by controlling the residence time in furnace of streams of intermediate carbon black product, that is to say, the time required for the passage of flows of burnt gas from the feedstock nozzle to the water quenching point.

According to the present invention, the carbon black having the above required characteristics can be blended in any of various elastomers such as natural rubber, styrene-butadiene rubber, polybutadiene rubber, isoprene rubber, butyl rubber, various other synthetic rubber which can be reinforced with normally used carbon black, mixture rubber of natural rubber and synthetic rubber, and mixture rubber of two or more kinds of synthetic rubber.

The carbon black is blended in a proportion within a range of 35 to 100 parts by weight per 100 parts by weight of a rubber component. If the blending amount of the carbon black in rubber is less than 35 parts by weight, the desired abrasion resistance cannot be obtained, while if it exceeds 100 parts by weight, an undesirably great loss of energy will result.

In the production of the rubber composition according to the present invention, it is feasible to appropriately add to and admix with a rubber component any of normally used vulcanizing agent, vulcanization accelerator, antioxidant, vulcanization accelerator activator, softener, plasticizer and so forth.

As before stated, the carbon black used according to the present invention has an aggregate characteristic such that two modal diameters are present in the aggregate equivalent Stokes diameter distribution curve, of which the first modal diameter $\overline{D}st_1$ is slightly smaller than the average equivalent Stokes diameter of conventional carbon blacks having the corresponding nitrogen adsorption specific surface area (N$_2$SA) and the second modal diameter $\overline{D}st_2$ is relatively large. It is generally known that the aggregate size distribution per unitary specific surface area of carbon black is greatly influential upon the dispersion and the processability, the abrasion resistance and the heat generating propensity or heat build-up of rubber containing the carbon black blended therein.

The carbon black used in the rubber composition according to the present invention has a particular aggregate characteristic and, as another characteristic thereof, a large nitrogen adsorption specific surface area (N$_2$SA = 70 to 185 m$^2$/g), so that it can serve as a desirable reinforcing material for a rubber component and, at the same time, have a desirable dispersion characteristic and a high processability. The carbon black can also impart a low heat build-up characteristic to a rubber component.

Thus, the rubber composition according to the present invention is possessed of a high abrasion resistance and, at the same time, a low heat build-up characteristic, which were regarded in the prior art as being incompatible characteristics and not being possibly satisfied at the same time. Also, the rubber composition retains other rubber characteristics each of which is of a high level. Accordingly, the rubber composition of the present invention can fully satisfy the characteristics of rubber composition for use for tire treads, required for suppressing the rolling resistance when a tire made of the rubber is run and for realizing an energy saving.

Now, the present invention will be described in further detail in connection with examples of the invention and comparative examples.

EXAMPLES 1 to 7 AND COMPARATIVE EXAMPLES 1 to 5

Production of various carbon blacks was operated, using an oil furnace 1 of a V-shaped structure as shown in FIG. 2. As shown, the furnace 1 comprises two generators 2 and 2' respectively having wind boxes 9 and 9' mounted at head ends respectively thereof, a burner 5 and a feedstock oil injection nozzle 6 which are mutually coaxially arranged in each of combustion chambers 4 and 4' (inner diameter: 500 mm, length: 1100 mm including a conical portion of 200 mm in length). The generators 2 and 2' are disposed at an angle of 60° relative to each other and are converged together into a main reaction zone 3 comprising a front-stage small diametral part 11 having 130 mm for the inner diameter and 700 mm for the length and a rear-stage large diametral part 10 having 300 mm for the inner diameter and 4000 mm for the length, the part 10 and the part 11 of the reaction zone 3 being connected to and communicated with each other.

The feedstock oil used is an aromatic hydrocarbon oil of the following specification:

| | |
|---|---|
| Specific gravity (15/4° C.): | 1.0703 |
| Engler viscosity (40/20° C.): | 2.10 |
| Benzene insolubles: | 0.03% |
| Correlation index (BMCI): | 140 |
| Initial boiling point: | 130° C. |

The fuel oil used is a hydrocarbon oil of the following specification:

| | |
|---|---|
| Specific gravity (15/4° C.): | 0.903 |
| Viscosity (cSt, at 50° C.): | 16.1 |
| Residual carbon content: | 5.4% |
| Sulfur content: | 1.8% |
| Flash point: | 96° C. |

Using the above described oil furnace, feedstock oil and fuel oil and under the production conditions shown in the below Table 1, preparations were made of carbon blacks (7 different kinds) having characteristics which are desirable according to the present invention.

Of each of the carbon blacks produced, the nitrogen adsorption specific surface area (N$_2$SA) and the modal diameters in the aggregate equivalent Stokes diameter distribution were determined, and the results of the determinations are shown in Table 2 below together with the calculated L values and so forth. In Table 2, further, the Comparative Examples 1 to 5 represent such carbon blacks produced according to the prior art method as having nitrogen adsorption specific surface areas (N$_2$SA) comparable to those of carbon blacks of the Examples and showing an aggregate equivalent Stokes diameter distribution having a single modal diameter.

TABLE 1

| Example No. | Generator (2 or 2') | Total Air Supply Rate (Nm$^3$/h) | Fuel Oil Supply Rate (kg/h) | Fuel Oil Combustion Rate (%) | Feedstock Oil Supply Rate (kg/h) | Residence Time in Furnace (milli-second) |
|---|---|---|---|---|---|---|
| 1 | 2 | 1420 | 68 | 195 | 271 | 2.8 |
|   | 2' | 1740 | 90 | 180 | 302 |   |
| 2 | 2 | 1450 | 62 | 220 | 352 | 7.9 |
|   | 2' | 2000 | 107 | 175 | 305 |   |
| 3 | 2 | 1500 | 61 | 230 | 357 | 9.8 |
|   | 2' | 1820 | 83 | 205 | 324 |   |
| 4 | 2 | 1190 | 42 | 265 | 459 | 12.6 |
|   | 2' | 2210 | 121 | 170 | 311 |   |
| 5 | 2 | 1300 | 51 | 240 | 424 | 8.7 |
|   | 2' | 1960 | 99 | 185 | 438 |   |
| 6 | 2 | 850 | 31 | 260 | 344 | 38.4 |
|   | 2' | 1440 | 82 | 165 | 325 |   |
| 7 | 2 | 1070 | 41 | 245 | 388 | 25.6 |
|   | 2' | 1480 | 69 | 200 | 451 |   |

TABLE 2

| | N$_2$SA (m$^2$/g) | Aggregate Stokes Modal Diameter (nm) Dst$_1$ | Aggregate Stokes Modal Diameter (nm) Dst$_2$ | Value of L | 110 − 0.3 × (N$_2$SA) |
|---|---|---|---|---|---|
| Example: | | | | | |
| 1 | 182 | 49 | 76 | 27 | 55 |
| 2 | 165 | 63 | 107 | 44 | 61 |
| 3 | 148 | 68 | 103 | 35 | 66 |
| 4 | 121 | 63 | 133 | 70 | 74 |
| 5 | 94 | 88 | 130 | 42 | 82 |
| 6 | 78 | 86 | 165 | 79 | 87 |
| 7 | 70 | 102 | 126 | 24 | 89 |
| Comparative Example: | | | | | |
| 1 | 168 | 65 | — | | |
| 2 | 143 | 70 | — | | |
| 3 | 115 | 73 | — | | |
| 4 | 91 | 97 | — | | |
| 5 | 73 | 110 | — | | |

Then, each of the various carbon blacks represented in the above Table 2 by Examples 1 to 7 and Comparative Examples 1 to 5 was blended in natural rubber according to the compounding recipe shown in the following Table 3.

TABLE 3

| Components Blended | Parts by Weight |
|---|---|
| Natural Rubber (RSS#1) | 100 |
| Carbon Black | 50 |
| Aromatic Oil (softener) | 4 |
| Stearic Acid (softener vulcanization accelerator activator) | 3 |
| Zinc Oxide (vulcanization accelerator activator) | 5 |
| Dibenzothiazyl disulfide (vulcanization accelerator) | 1 |
| Sulfur (vulcanizing agent) | 2.5 |

Each of the resulting blends was cured at 145° C. for 40 minutes to obtain rubber compositions, of which various rubber characteristics were determined according to methods and under conditions as below recited. Results of the determinations are shown in the below Table 4, in which Example Nos. 1 to 7 and Comparative Example Nos. 1 to 5 correspond to those in the Table 2, having regard to the carbon blacks.

(1) Abrasion Loss Amount:

The determination was made using a Lambourn abrasion tester (a mechanical slip type) under the following conditions.

Test Piece:
  thickness: 10 mm,
  outer diameter: 44 mm
Emery Wheel:
  type: GC type
  particle size: 80
  hardness: H
Carborundum Powder Added:
  particle size: #80
  amount: about 9 g/min.
Relative Slipping Ratio between the Emery wheel surface and the test piece: 24%, 60%
Rotation Number of the Test Piece: 535 rpm
Testing Load: 4 kg (2) Heat Build-Up Characteristic:

The determination was made according to ASTM D623-78 (used a Goodrich flexometer).

(3) Mooney Viscosity:

The determination was made according to JIS K6300-1974, "Physical Testing Methods for Unvulcanized Rubber".

(4) Others:

The determination was made according to JIS K6301-1975, "Physical Testing Methods for Vulcanized Rubber".

From considering the results of determinations entered in the below Table 4, it is clearly seen that in cases where carbon blacks used are of a same level with respect to the nitrogen adsorption specific surface area (N$_2$SA), the rubber compositions containing carbon blacks of Examples 1 to 7 blended therein are effectively improved with respect to the resilience and the heat build-up characteristic which are influential upon the dynamic performance characteristic of rubber compositions and also with respect to lowering of the Mooney viscosity which is a factor influential upon the dispersion property and the processability, while the rubber compositions have an unchanged abrasion resistance, in comparison to the rubber compositions containing carbon blacks of Comparative Examples 1 to 5 blended therein.

TABLE 4

| | Abrasion Loss Amount (ml/5 min) 24% slip | Abrasion Loss Amount (ml/5 min) 60% slip | Resilience (%) | Heat Build-up (%) | Hardness (Hs) | 300% Modulus (kg/cm$^2$) | Tensile Strength (kg/cm$^2$) | Elongation (%) | Mooney Viscosity (125° C.) |
|---|---|---|---|---|---|---|---|---|---|
| Examples: | | | | | | | | | |
| 1 | 0.0681 | 0.1044 | 45.8 | 32.5 | 66 | 106 | 299 | 610 | 102 |
| 2 | 0.0710 | 0.1094 | 47.3 | 31.6 | 64 | 110 | 295 | 620 | 99 |
| 3 | 0.0720 | 0.1089 | 48.2 | 30.8 | 64 | 117 | 285 | 610 | 97 |
| 4 | 0.0794 | 0.1190 | 54.5 | 28.3 | 64 | 119 | 278 | 580 | 88 |
| 5 | 0.0811 | 0.1200 | 56.9 | 26.7 | 64 | 124 | 291 | 540 | 85 |
| 6 | 0.0894 | 0.1240 | 57.8 | 21.3 | 63 | 122 | 273 | 540 | 77 |
| 7 | 0.0882 | 0.1229 | 58.0 | 21.5 | 63 | 120 | 278 | 540 | 76 |
| Comparative Examples: | | | | | | | | | |
| 1 | 0.0701 | 0.1086 | 45.5 | 32.8 | 66 | 108 | 297 | 620 | 106 |
| 2 | 0.0729 | 0.1091 | 47.0 | 33.1 | 65 | 114 | 288 | 610 | 100 |
| 3 | 0.0778 | 0.1174 | 49.6 | 31.6 | 65 | 115 | 280 | 590 | 92 |
| 4 | 0.0819 | 0.1181 | 51.5 | 30.7 | 65 | 130 | 288 | 530 | 87 |
| 5 | 0.0876 | 0.1216 | 54.7 | 23.8 | 64 | 121 | 275 | 540 | 81 |

We claim:

1. A rubber composition comprising 35 to 100 parts by weight of a carbon black per 100 parts by weight of a rubber component, the carbon black having a nitrogen adsorption specific surface area ($N_2SA$) within a range of 70 to 185 $m^2/g$ and an aggregate characteristic which shows two modal diameters in the aggregate equivalent Stokes diameter distribution and has a difference between the two modal diameters L (nm) to be calculated from the following equation (1) which satisfies the following formula (2):

$$L = \overline{D}st_2 - \overline{D}st_1 \quad (1)$$

$$20 \leq L \leq 110 - 0.3(N_2SA) \quad (2)$$

wherein $\overline{D}st_1$ and $\overline{D}st_2$ respectively denote a first modal diameter (nm) and a second modal diameter (nm) in the aggregate equivalent Stokes diameter distribution determined by a centrifugal classification method.

2. A rubber composition as claimed in claim 1, wherein said rubber component is an elastomer selected from the class consisting of natural rubber, synthetic rubber, mixture rubber of natural rubber and synthetic rubber, and mixture rubber of synthetic rubber.

3. A rubber composition as claimed in claim 2, wherein the synthetic rubber is an elastomer selected from the class consisting of styrene-butadiene rubber, polybutadiene rubber, isoprene rubber and butyl rubber.

4. A rubber composition as claimed in claim 1, which contains blended therein at least one chemical selected from the class consisting of a vulcanizing agent, a vulcanization accelerator, an antioxidant, a vulcanization accelerator activator, a softener and a plasticizer.

* * * * *